Figure 1:
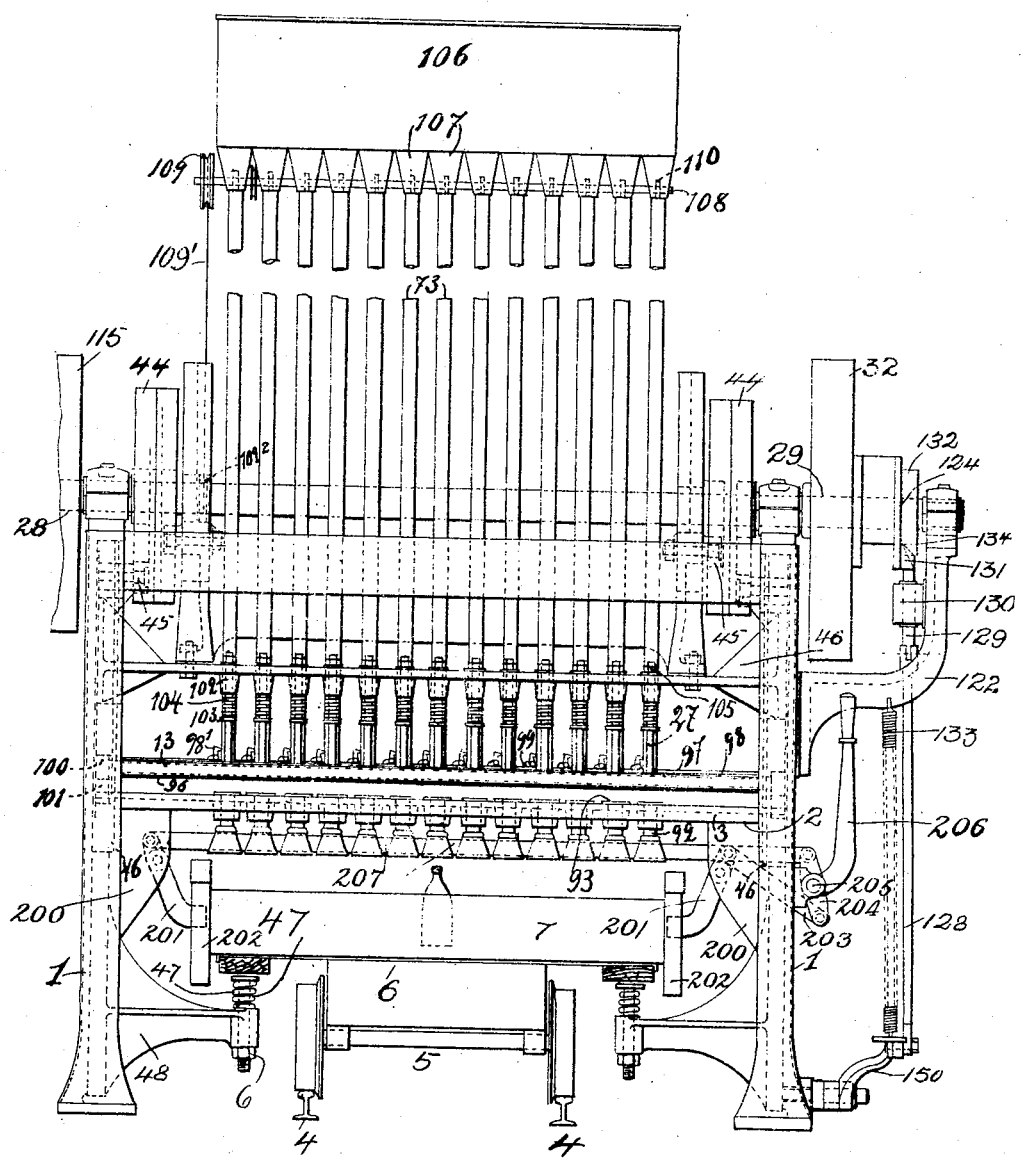

No. 779,544. PATENTED JAN. 10, 1905.
S. HYDÉN & K. A. SIMONSSON.
APPARATUS FOR SIMULTANEOUSLY CORKING A NUMBER OF BOTTLES.
APPLICATION FILED JULY 18, 1903.

5 SHEETS—SHEET 1.

Witnesses:
Chs. Fuss.
C. A. Jarvis.

Inventors:
Sven Hydén.
Knut Alfred Simonsson.
By their Attorney
F. H. Richards.

No. 779,544. PATENTED JAN. 10, 1905.
S. HYDÉN & K. A. SIMONSSON.
APPARATUS FOR SIMULTANEOUSLY CORKING A NUMBER OF BOTTLES.
APPLICATION FILED JULY 18, 1903.

5 SHEETS—SHEET 2.

Witnesses:
C. A. Jarvis.
G. F. Fuss.

Inventors:
Sven Hydén.
Knut Alfred Simonsson
By their Attorney,
F. A. Richards.

No. 779,544. PATENTED JAN. 10, 1905.
S. HYDÉN & K. A. SIMONSSON.
APPARATUS FOR SIMULTANEOUSLY CORKING A NUMBER OF BOTTLES.
APPLICATION FILED JULY 18, 1903.
5 SHEETS—SHEET 3.
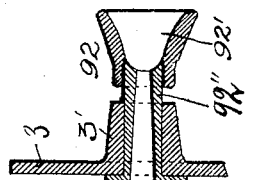
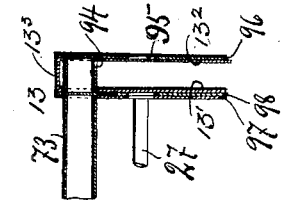
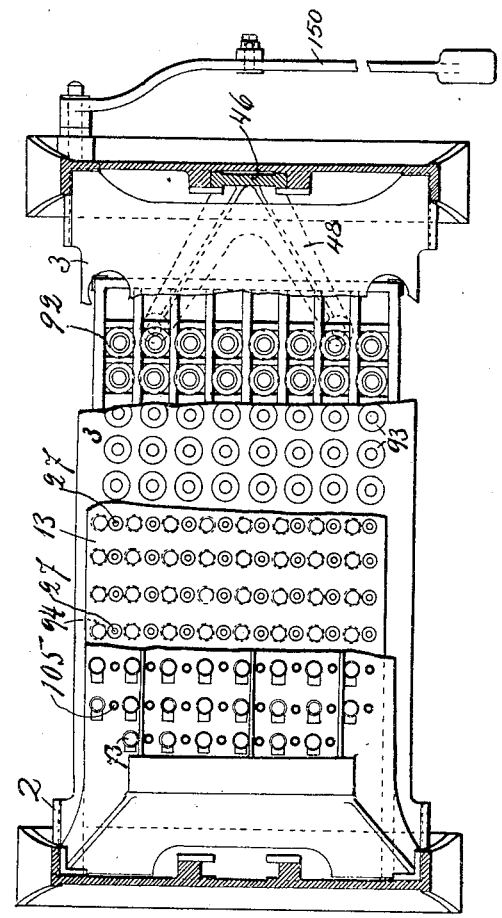
Witnesses:
C. A. Jarvis.
C. G. Fuss.
Inventors:
Sven Hydén.
Knut Alfred Simonsson.
By their Attorney,
F. H. Richards.

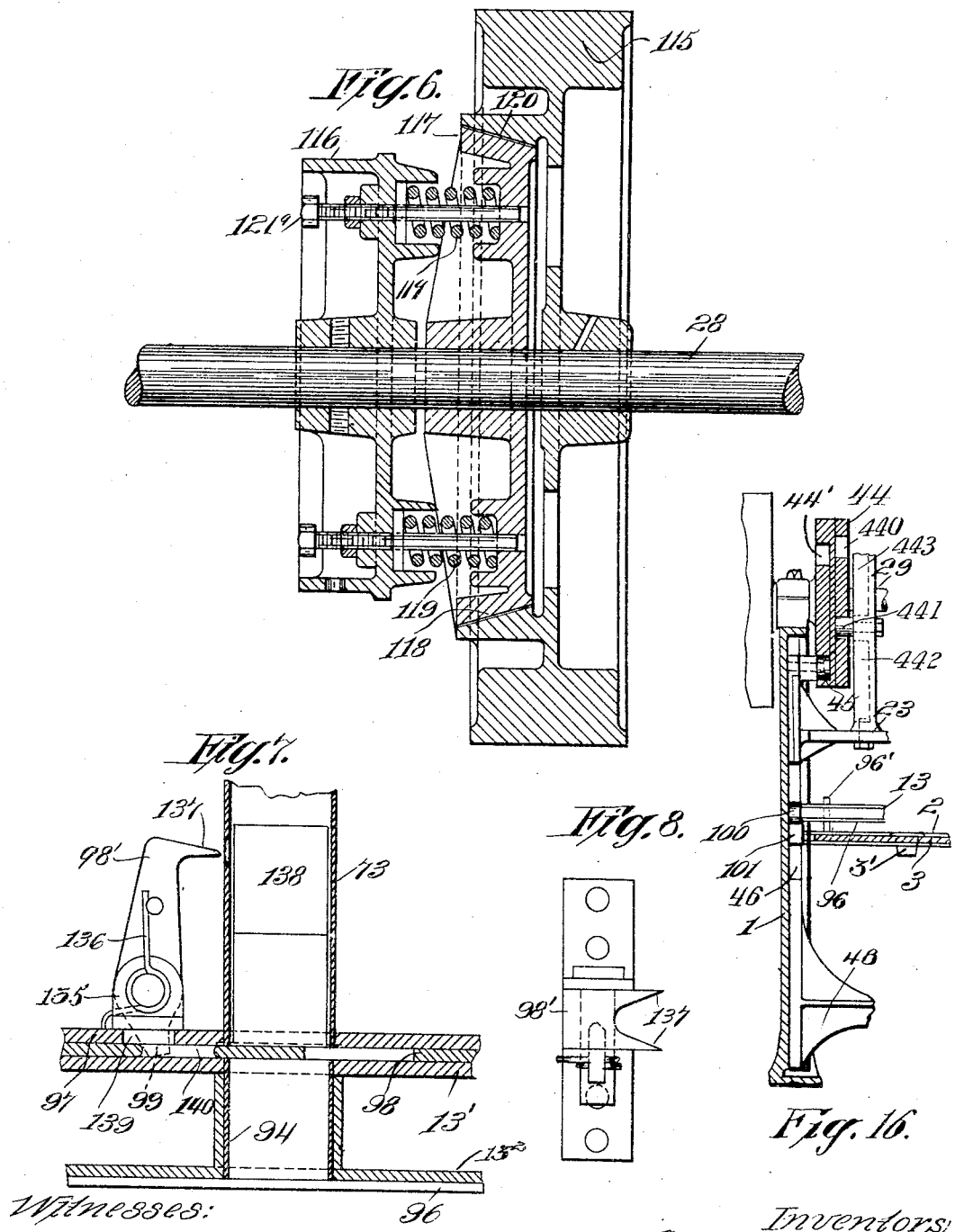

No. 779,544. PATENTED JAN. 10, 1905.
S. HYDÉN & K. A. SIMONSSON.
APPARATUS FOR SIMULTANEOUSLY CORKING A NUMBER OF BOTTLES.
APPLICATION FILED JULY 18, 1903.
5 SHEETS—SHEET 5.
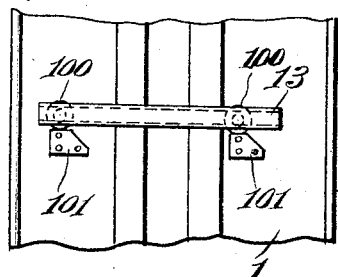
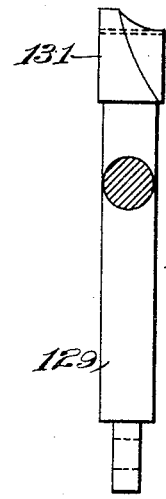
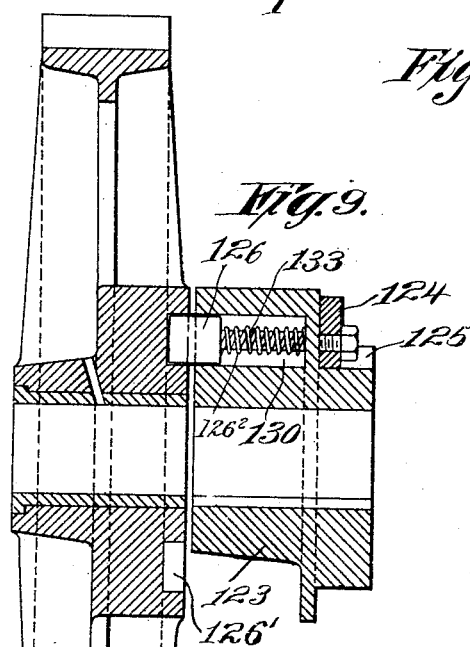
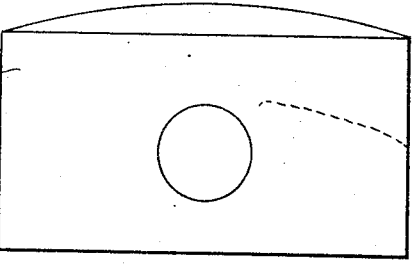
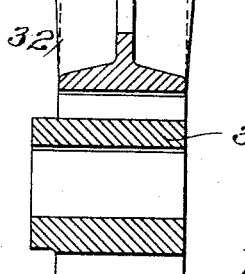
Witnesses:
Robert Adt
F. L. Maynard.
Inventors:
Sven Hydén,
Knut A. Simonsson,
By their Attorney,
F. N. Richards.

No. 779,544.

Patented January 10, 1905.

UNITED STATES PATENT OFFICE.

SVEN HYDÉN AND KNUT ALFRED SIMONSSON, OF STOCKHOLM, SWEDEN.

APPARATUS FOR SIMULTANEOUSLY CORKING A NUMBER OF BOTTLES.

SPECIFICATION forming part of Letters Patent No. 779,544, dated January 10, 1905.

Application filed July 18, 1903. Serial No. 166,167.

*To all whom it may concern:*

Be it known that we, SVEN HYDÉN and KNUT ALFRED SIMONSSON, subjects of the King of Sweden and Norway, residing in Münchens Bryggeri, Stockholm, in the Kingdom of Sweden, have invented certain new and useful Improvements in Apparatus for Simultaneously Corking a Number of Bottles, of which the following is a specification.

The invention relates to and has for its object to provide an improved bottle-corking machine.

In the apparatus described in Patent No. 721,803, granted to us March 3, 1903, there are illustrated three horizontal plates, arranged one above the other, in a frame. The lower bottle-engaging plate serves to lift the bottles to be corked from a bottle-stand or the like placed under it, the plate being for this purpose movable up and down and having a series of openings arranged and shaped to receive the necks of the bottles and means for engaging the said necks. The intermediate plate is stationary and provided with a series of openings, the lower portions of which are adapted to receive the mouths of the bottles, while the upper portions of the same are adapted to receive the compressed corks, and also with means for compressing the corks over these openings. The upper plate is movable up and down, having plungers, pins, or the like on its under side adapted upon the downward movement of the plate to force the compressed corks through the openings of the intermediate plate into the bottles, resting with their mouths in the lower portions of said openings. It has, however, proved to be difficult when the lower plate is movable to make the same keep sufficiently steady during the forcing of the corks into the bottles, because of the great strain to which it is then exposed, more especially when a large number of bottles are simultaneously corked, as when, for instance, all the bottles of a bottle-stand, containing, for instance, one hundred bottles, are corked at the same time. Another reason why it has proved difficult to find an effective means to have the lower plate movably mounted and yet to keep it steady during the corking process is that only a very small portion of the plate offers points of application for means for so moving it, since the upper side of the lower plate when in its highest position is close to the intermediate plate and there must also be room enough under the lower plate for the bottles, with their stand and other carrying means. By our present invention these difficulties have been overcome in that the lower plate is stationary, the bottles movable up and down relatively to the said stationary plate, and the intermediate plate is movable.

The height of bottles varies slightly, and when placed in a stand it might be that those bottles of greatest height would be so located that the pressure of the holding-plate upon them would crush or chip them, and also if the plungers all acted in absolute unison the corks of the highest bottles would be forced into the necks too far. To obviate these difficulties, the holding means for the necks or mouths of the bottles may be each independently and automatically adjustable upon the entry of the bottle within such holding means, which will be more particularly pointed out hereinafter.

In order that our invention may be readily understood, we will describe the same, having reference to the accompanying drawings.

Like characters of reference designate corresponding parts in all the figures of the drawings.

Figure 2:
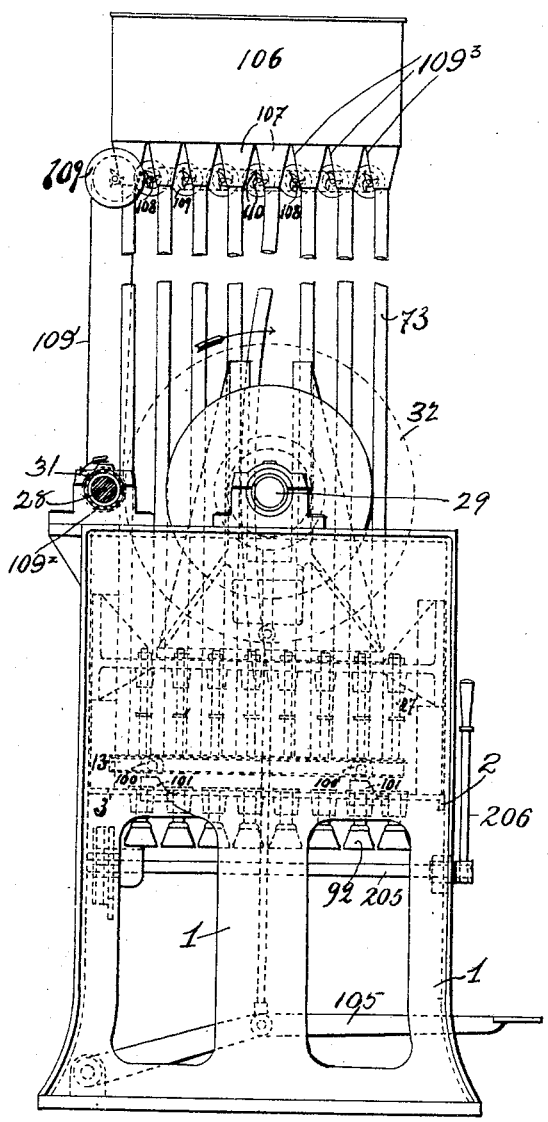

Figure 1 is a front elevation of a machine embodying the present improvements; Fig. 2, an end elevation, and Fig. 3 a plan view, of the apparatus with some parts removed. Fig. 4 is a detail view of a part of the lower plate; Fig. 5, a cross-section of a portion of the plate 13 with adjacent parts. Fig. 6 is a longitudinal section of a safety coupling device. Fig. 7 is a vertical section through one of the cork-tubes and shows the cork-detent lever in side view. Fig. 8 is a top view of such lever and its mounting. Fig. 9 is a longitudinal section of the coupling device at the right-hand side of Fig. 1. Figs. 10 to 14, inclusive, are details of portions of said coupling device. Fig. 15 is a view of a portion of one of the end framing members and the end of the plate or member 13, and Fig. 16 is a vertical section of portions of the machine illustrated at the left-hand end of Fig. 1.

The frame of the apparatus in the form shown consists of two open-work framing members 1, held together by two beams 2. These beams serve as a support for the lower plate 3, inasmuch as the latter with its longer edges enters into the groove of the respective beams 2, which are U-formed in cross-section, and by means of bolts (not shown in the drawings) fastened to the walls or framing members 1 and the edges of the plate 3 rest against the walls 1. The plate 3 is thereby safely secured in the frame. At the base of the frame (in the present instance the floor) there are provided rails 4 passing through the frame and on which trucks may run. A truck 5 is shown in the drawings standing at its proper place in the frame. On the truck is a plate 6, on which the bottle-stand 7, containing the uncorked bottles, is placed.

The arrangements for giving the necessary movement to the different parts of the apparatus are as follows: At the top of the frame are shown longitudinal shafts 28 and 29, having suitable bearings in the framework. The shaft 28 may be driven by a pulley 115 from some source of power. (Not shown.) On this latter shaft is further fixed a pinion 31, meshing with a gear 32, loose upon the shaft 29. On the shaft 29 are fixed two cam-wheels 44. On an inner cam-face 44' rollers 45 run, which rollers are carried by slides 46, supported in a guide in the wall 1 of the machine-frame. The lower end of the slide carries a branched member 48, each branch of which is provided with a yielding support 47, which engage the plate 6, upon which the bottle-stand and the bottles are carried during the elevating and lowering of the said supports. The wheels 44 also have inner cam-faces 440, on which the rollers 441 run, which rollers are carried by standards 442, secured to the plate 23. The standards 442 may have forked ends 443 to straddle the shaft 29 to steady the standards against the working of the cam upon the roller. The cam-faces 44' and 440 are so timed one relative to the other that the plate 23 will be lowered in proper sequence to the raising of the bottle-stand.

The lower or stationary plate 3 may be provided with tube-pieces 92, movable up and down in holes in the said plate, provided with guides 3'. These tube-pieces consist of a funnel-shaped lower portion 92' for receiving the upper portions of the bottles and are fast with a conically-bored sleeve 92'', provided with an upper flange 93.

The intermediate plate 13 may be in the form of a box consisting of cover, bottom, and side walls, (designated by the reference characters 13', 13², and 13³, respectively.) In the cover and bottom of this box holes are made one above another, and in these holes are fixed sleeves 94, which form passages through the plate for the corks. Under the bottom is arranged a sliding plate 96, provided with holes 95. Said plate when being moved relatively to the said box closes or opens the lower mouths of the sleeves 94 when the holes 95 are brought out of or into register with the said mouths. On the lower ends of the cork-feed tubes 73 is fixed a plate 97, provided with holes for the tubes, and under this plate 97 is arranged a sliding plate 98 of the same construction as the plate 96. On the plate 97, near each tube, is pivoted a yielding lever 98', provided with points which enter a hole in the tube and with a projection 99, which enters a hole in the plate 97, and a suitably-formed recess (see Fig. 7) in the plate 98. The levers 98' are each pivoted between two standards 135, fixed on the plate 97. The spring 136 tends to hold the point or points 137 against the corks 138 in the tube 73. The projection 99 of the lever 98' enters a hole 139 in the plate 97 and a hole 140 in the plate 98. The points 137 may be held out of engagement with the cork 138 by the engagement of the left wall of the hole 140 with the projection 99. (See Fig. 7.) When the plate 98 is moved to the left, the points 137 will be moved into engagement with the cork 138 through the action of the spring 136. The plate 13 is provided at each end with two rollers 100, running each on a sloping plane of an abutment 101 on the frame. (See Figs. 2 and 15.) This organization causes the plate 13 to be moved obliquely in its downward movement, so that the sleeves 94 will respectively register with the tube-pieces 92 and the pins or plungers 27 when the plate 13 reaches its lower position. When, however, the plate 13 is in its upper position, the sleeves 94 are under the tubes 73. The lifting and lowering of the plate 13 and the sliding of the plates 96 98 may be effected in any suitable manner. Such arrangements are not shown in the drawings.

The pins or plungers 27 are movable up and down in the sleeves 102 of the plate 23, and each is provided with a fixed abutment 103. Between this abutment and the plate 23 coiled springs 104 are placed around the pins or plungers. The upper end of the pin projecting from the plate 23 is provided with a stop 105. The tubes 73 depend from a hopper 106, the bottom of which is provided with funnels 107, leading to the tubes 73. Rotary shafts 108, carry arms 110, which by the rotation of the shafts 108 enter holes in the funnels 107 and agitate the corks in the hopper. One of the shafts 108 has a pulley 109, driven by a belt 109', passing over a pulley 109² on the shaft 28. The other shafts are connected to such first shaft by pinions 109³.

To the right in Fig. 1 is shown a coupling device of a known construction operated by a treadle, said coupling device serving to couple the movable portions of the apparatus in such a way that they execute the corking process, and such coupling may be in the form illustrated in Figs. 9 to 14, inclusive, wherein the pinion 31, above referred to as fast on the shaft 28, is in mesh with the gear-wheel 32, loose on the shaft 29, and adjacent to the gear-wheel 32 one portion or member 123 of the coupling device is fast on the shaft 29. On the said member 123 is arranged a slide 124, movable in a guideway 125 and provided with a plunger 126, adapted to engage sockets 126' in the said face of the gear-wheel 32 and pressed into said sockets by a spring 126². The slide 124 is controlled from a treadle 150 through a rod 129, movable in a guide 130 and having its upper end formed as a wedge 131, normally held on a circular portion 132 of the member 123 by means of a spiral spring 133, secured at its ends to the treadle 150 and to the arm 122 of the frame. A link 128 is pivoted to said treadle and to the rod 129 and forms the connection between the rod and treadle. The shaft 28 rotates continuously. The shaft 29 will be rotated only when it is desired that the corking apparatus shall be operated. The slide 124 has a wedge-shaped surface 134, and the wedge 131 normally engages said surface 134, so that the slide 124 is held in its outer position and the plunger 126 out of engagement with the sockets 126'. When it is desired that the apparatus shall work, it is only necessary to press on the treadle 150, and by doing so the wedge 131 will be drawn out of contact with the slide 124 and the plunger 126 will enter one of the sockets 126' through the action of the spring 126², and the shaft 29 will then be caused to rotate and the parts controlled thereby be operated.

To the left of Fig. 1 is shown a part of a safety friction-coupling device of a known construction and may be in the form illustrated in Fig. 6, wherein 115 is a pulley loose on the shaft 28, 116 is a wheel fast on the same shaft 28, 117 is a wheel having a conical periphery 118. Between the wheels 116 and 117 are arranged spiral springs 119, by means of which the wheel 117 is pressed with its conical periphery against a corresponding conical surface 120 of the pulley 115. The tension of the springs 119 is controlled by screws 121ª. The pulley 115 is thus coupled to the shaft 28. If for some reason the resistance in the apparatus should be too great, this resistance will overcome the friction between the surfaces 118 and 120, so that the pulley 115 will slip on the wheel 117, thus avoiding breakage in the apparatus.

The hopper 106 is to be filled with corks, which will drop into the funnels 107 and from them pass into the tubes 73. In order to facilitate the dropping down of the corks, arms 110 are arranged, which stir the corks, so that they will be continually fed into the tubes 73. When the apparatus is in its initial position, there is in each sleeve 94 a cork, which is prevented from dropping down by the fact that the holes in the plate 96 do not register with the sleeves 94. When the plate 13 is moved to its lower position to rest upon the tube-pieces 92, the plate 96 partakes of the downward movement of the plate 13, but does not move sidewise. The plate 3 may carry pins 96', passing through holes in the plate 96, with which they have a working fit, and the pins may pass through the other plates of the member or plate 13, which have sufficient play to permit the sidewise movement thereof. On account of this the holes of the plate 96 are brought into register with the lower mouths of the sleeves 94, so that the corks may drop into the tube-pieces, whereupon they are driven into the respective bottles by means of the plungers 27. The conical bore of the tube-pieces compresses the corks to the desired diameter during this operation.

By this present improvement the pressure upon the bottles during the corking operation is transferred to the bottom of the bottle-stand, and consequently to the shafts of the rollers on the slides 46. If the bottles are of different lengths, the tube-pieces 92 will move more or less when the bottles are lifted. The plungers 27 are correspondingly moved, relatively to the plate 23, during the corking process, and through the abutment 103 always being stopped by the flange 93 of the respective tube-pieces 92 the corks are driven into all the bottles the same distance. Each of the springs 104 is strong enough not to yield until the abutment 103 strikes the flange 93. When the plate 13 has reached its upper position, the plate 96 has again closed the lower mouths of the sleeves 94, and the plate 98 is now removed in such a way that the passage from the tubes 73 to the sleeves 94 will be free. The lowermost corks resting freely upon the plate 98 consequently drop into their sleeves 94; but the corks above such lowermost cork are locked by the levers 98'. The plate 98 is then moved so that the lower mouths of the tubes are shut up. Owing to the form of the recesses in the plate 98, in which recesses the projections 99 of the levers 98' enter, the latter are forced at the proper time to withdraw their points from the tubes 73, so that the corks will sink down upon the plate 96, whereupon a new corking operation can begin.

The bottles in the stand 7 may in a good many instances not be in the exact positions they should occupy when the car rolls under the machine upon its tracks 4, and to insure the bottle-necks properly entering the funnel-shaped portions 92' of the movable tube-pieces there are shown at each side of the position to be occupied by the stand wings 200, extending from the framing of the machine upon which are supported levers 201, carrying plates 202 to engage the respective sides of the stand 7 and bring the same to its proper position. The lever 201 upon one side of the machine is shown as connected by a link 203 to a lever 204, pivoted at 205. An operating handle-lever 206 is fast with this lever 204 and the lever 201 at the opposite side of the machine is connected by means of a link 207 with the lever 204, so that upon moving the handle 206 the plates 202 will be caused to engage the bottle-stand and shift the same toward one side or the other, as the case may demand. After it has been properly positioned the handle may be returned to its normal position and the stand permitted to be moved by the operation of the machine.

The operation of the machine may be stated to be substantially as follows: Assuming that the bottles will be carried upon a truck, as herein illustrated, the filled bottles will be placed in the bottle-stand 7 and placed upon the truck and run into the lower part of the machine, when they will be brought to the proper position by shifting the stand from side to side, as the case may demand, by means of the plates 202, actuated by the handle 206. The corks are fed to the cork-plungers from the hopper 106 down through the tubes 73, the corks being agitated and prevented from collecting and clogging by the agitators at the hopper funnel portions 107 of such tubes, as was described in detail above. A tube 73 will be provided for each plunger and will feed corks one at a time within the plate 13. One cork will enter the plate, and upon the lowering of the plate the plate as a whole will move forward and downward, the rolls 100 running down the inclined faces of the tracks 101, which will bring the corks within such plate under the plungers 27, the portion 96 of the plate being held from sidewise movement by the pin 96, which is carried by the plate 3. This will close the lower mouths of the sleeves 94 and prevent the escape of corks when not desired. The movement of the plate also operates a series of detents 137 to catch the corks above the cork which is to drop so as to relieve the weight upon that cork and also prevent the dropping of more corks than is desired. The cork will then be in position to be forced through the conical sleeve 92″, and so on into the bottle-neck. After the stand has been released from the grip of the plates 202 the operator will press upon the treadle 150, which will withdraw the engaging face 131 from the engaging face 134 of the member 124, thereby permitting the catch 126 to respond to the action of its spring and permitting it to engage one of the notches 126′ of the wheel 32, which will then cause such wheel to impart rotation to the shaft 29 by means of the coupling member 123, which is fast with such shaft, the wheel 32 being continuously rotated from the pinion 31 upon the driving-shaft 28. This will permit the parts controlled by the shaft 29 to be actuated—that is, the tray of bottles will be elevated and the cork-plungers carried by the plate 23 will be depressed. Upon the elevation of the bottles to be corked those which are higher than the others will raise the tube-pieces 92 so that the flanges 93 will come into the path of movement of the abutments 103 upon the corking-plungers and limit the length of the stroke of the plunger so that the corks will all be seated to the proper distance in the necks of the bottles irrespective of their height. This not only affords uniformity in the seating of the corks, but also prevents the breaking and chipping of unduly high bottles, which would be liable to occur were the full force of elevation brought to bear upon a single bottle.

Having thus described our invention, we claim—

1. In a bottle-corking apparatus, the combination with means to elevate bottles to be corked, plungers to sink corks into such bottles, and shiftable cork-guides for the respective bottles adapted to guide compressed corks to the bottle-mouths and to limit the strokes of the said plungers relative to the heights of the respective bottles.

2. In a corking apparatus, the combination with means to feed the corks thereto and comprising a hopper and chutes, a box at the bottom of the chutes having openings to register with the necks of the bottles and with cork-plungers, cork-plungers to pass therethrough, and shiftable double top and bottom members for the box having openings to register with the openings in the box to open and close the same and place them out of register.

3. In apparatus to cork a number of bottles at one time, the combination with corking-plungers, of a bottle-stand, means to elevate the stand to present the mouths of the bottles carried thereby at the general working position of said plungers, and means actuated by the bottle-mouths severally to control the working strokes of the respective plungers.

4. In apparatus to cork a number of bottles at one time, the combination with a table to support the bottles to be corked, means to raise and lower the same, a series of plungers, means to actuate the plungers with a normally uniform length of stroke the limits of which are normally in a plane parallel with the plane of the table, and means to enable any bottle upon the table to vary and positively limit the stroke of its corking-plunger relatively to such planes.

5. In apparatus to cork a number of bottles at one time, the combination with corking-plungers, of a bottle-stand, a series of independently-movable members having abutments to engage the plungers and adapted to be engaged by the mouths of the bottles at the general working positions of said plungers and shifted thereby to limit the strokes of the plungers, and means to present the bottle-mouths to such members.

6. In apparatus to cork a number of bottles at one time, the combination with a table to support the bottles to be corked, means to raise and lower the same, a number of plungers, yieldable means to actuate the plungers with a normally uniform length of stroke the limits of which are normally in a plane parallel with the plane of the table, and a number of members independently adapted to be shifted by the bottles to engage the plungers to enable any bottle upon the table to vary the stroke of its corking-plunger relatively to such planes.

7. In apparatus to cork a number of bottles at one time, the combination with a bottle-stand, of means to elevate the same to place the bottles at the working position of the corking apparatus, means to seat a cork in each bottle, means to normally actuate the same in unison, yieldable connections between the actuating means and the cork-seating means severally, and means comprising a cork compressor and guide, a bottle-mouth engaging abutment, and an abutment to engage the cork-seating means for each of the bottles and adapted to vary the working position of the cork-seating means therefor and positively limit the working stroke thereof.

In witness whereof we have hereunto set our hands in presence of two witnesses.

SVEN HYDÉN.
KNUT ALFRED SIMONSSON.

Witnesses:
J. F. A. RUTBACK,
E. BOUMONVILLE.